United States Patent Office 3,723,348
Patented Mar. 27, 1973

3,723,348
COORDINATION CATALYST
David Apotheker and Norman M. van Gulick, Wilmington, Del., assignors to E. I. du Pont de Nemours and Company, Wilmington, Del.
No Drawing. Continuation-in-part of application Ser. No. 699,361, Jan. 22, 1968, which is a continuation-in-part of application Ser. No. 624,243, Mar. 20, 1967. This application May 15, 1970, Ser. No. 37,937
Int. Cl. C08f 3/02
U.S. Cl. 252—429 B          17 Claims

ABSTRACT OF THE DISCLOSURE

A coordination catalyst system capable of polymerizing alpha-olefins at high efficiency and consisting essentially of a hydrocarbon-soluble vanadium compound, e.g., vanadium oxytrichloride, an organoaluminum halide, e.g., diethylaluminum chloride, a halogen-containing oxidant e.g., benzotrichloride and a hydrocarbon-soluble activator which is more reactive with organoaluminum halides present during polymerization than is said oxidant, e.g., triethylaluminum, the ratios of aluminum atoms, oxidant moles and activator moles to vanadium atoms being 3–200, 1–2000 and 0.1–150, respectively. The high efficiency of this catalyst system obviates the necessity for removing catalyst residues from a polymer produced by its use.

PRIORITY

This application is a continuation-in-part of application Ser. No. 699,361, now abandoned, filed Jan. 22, 1968 as a continuation-in-part of application Ser. No. 624,243, filed Mar. 20, 1967, now abandoned.

BACKGROUND OF THE INVENTION

This invention relates to a new coordination catalyst system for polymerizing alpha-olefins and to a process for producing alpha-olefin polymers therewith.

It has been reported that one can polymerize alpha-olefins alone and in combination with other olefins in an inert organic diluent in the presence of a coordination catalyst comprising a vanadium compound soluble in the organic diluent, an organoaluminum compound and a halogen containing oxidant.

The above-described prior art coordination catalysts are effective for polymerizing alpha-olefins to produce OM, EOM and EPDM polymers. An OM polymer is formed by polymerizing at least one alpha-olefin and has a backbone comprising essentially successive alkylene groups; an EOM polymer is an OM polymer prepared from ethylene and at least one other alpha-olefin. An EPDM polymer is an EOM polymer prepared from ethylene, propylene and a non-conjugated diene.

Although the above-described catalyst systems are effective in producing OM polymers they have relatively short lives and there has been a need to increase the efficiency, that is, to increase the amount of polymer which a given quantity of catalyst can produce. With catalysts containing vanadium it has been essential that polymers produced therewith be washed or otherwise purified to remove vanadium residues since such residues have an extremely deleterious effect upon the polymer during use, including a lowering of electrical resistance and stability against thermal oxidation, coloring and the like. Even very small amounts of vanadium compounds can produce an undesirable effect on OM polymers during their use. Because purifying such polymers requires time and expense, there has been a need for a catalyst system having an efficiency sufficiently high so that the polymers produced therewith would not require any purification whatsoever. Also, vanadium compounds are expensive and it is therefore desirable to improve the efficiency of vanadium based catalyst so that less vanadium is needed to produce a given amount of polymer.

THE INVENTION

In accordance with this invention there is provided a coordination catalyst consisting essentially of (a) a hydrocarbon soluble vanadium compound, (b) an organoaluminum halide, (c) a halogen-containing oxidant which is (i) bis(perchloroallene) that is, perchloro-1,2-dimethylenecyclobutane, carbon tetrabromide, or an unsaturated perchlorinated acid halide, preferably of about 3–6 carbon atoms, (ii) a compound of the formula $LCX_nR^1_{3-n}$ wherein X is iodine, chlorine or bromine, $n=2-3$, $R^1$ is H, perhaloalkyl preferably of about 1–6 carbon atoms, aryl or haloaryl preferably of about 6–10 carbon atoms, and Y is aryl, preferably of about 6–10 carbon atoms, or (iii) a compound of the formula $Y'CX_3$ wherein $Y'$ is

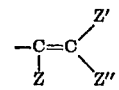

wherein Z is hydrogen, alkyl, preferably of about 1–20 carbon atoms, haloalkyl, preferably of about 1–6 carbon atoms, aryl or haloaryl, preferably of about 6 to 10 carbon atoms, or halogen and $Z'$ and $Z''$ are independently halogen, hydrogen or trichloromethyl; when the organoaluminum halide of component (b) is an alkyl aluminum dihalide, then the halogen containing oxidant can also be a compound of the formula $CX_nH_{3-n}J$ or $R^7SO_mX$ wherein X and $n$ are as defined above, $m=1-2$, $R^7$ is halogen, haloalkyl, alkyl, preferably of about 1–20 carbon atoms, or aryl or haloaryl, preferably of about 6–10 carbon atoms, J is $-CO_2R$, $-COR'$, $-CONR_2$ or $-SO_mX$ wherein R represents hydrogen, alkyl of about 1–20 carbon atoms, aryl of about 6–10 carbon atoms, haloaryl of about 6–10 carbon atoms, or alkaryl of about 7–20 carbon atoms, R' represents alkyl of about 1–20 carbon atoms, halogen, haloalkyl of about 1–10 carbon atoms, perhaloalkenyl of about 2–6 carbon atoms, aryl of about 6–10 carbon atoms, haloaryl of about 6–10 carbon atoms, or alkaryl of about 7–20 carbon atoms; and (d) an inert organic diluent, the improvement in combination therewith consisting essentially of (e) a hydrocarbon soluble activator which is more reactive with the organoaluminum halide under the polymerization conditions utilized than is the oxidant. The activator is a hydrocarbon soluble compound selected from the group: (1) isoprenyl aluminum, (2) trialkyl aluminum, (3) Lewis base which is a monofunctional ether, ketone, amide or amine or a polyfunctional ether, ketone, amide or amine wherein the hetero atoms of the functional groups are separated by at least 6 carbon atoms, or (4) a compound of the formula

where $-A$ is $-OR^4$, acetylacetonate, $-NR^5R^4$,

or

$R^2$ being alkyl, Cl or Br, each of $R^3$, $R^4$ and $R^5$ being an alkyl group, $R^6$ being alkylene, each of said compounds of (2), (3) and (4) containing less than about 61 carbon atoms, preferably less than about 31.

Preferably all of the components of the catalyst are hydrocarbon soluble at least to the extent necessary to provide the component ratios set forth herein so the catalyst can be used conveniently. The catalyst can be used in both solution and dispersion polymerization. In this catalyst system the ratio of aluminum atoms to vanadium atoms is about $$\frac{3-200}{1}$$

preferably $$\frac{10-200}{1}$$

the ratio of oxidant moles to vanadium is about $$\frac{1-2000}{1}$$

preferably $$\frac{2-100}{1}$$

and the ratio of activator moles to vanadium atoms is about $$\frac{0.1-150}{1}$$

preferably $$\frac{0.5-100}{1}$$

and the vanadium component is present in an amount of 0.001–1 millimole per liter of diluent present.

Thus the catalyst system of this invention is essentially a modification of a vanadium-based coordination catalyst containing an oxidant, the modification consisting essentially of the incorporation in said catalyst of an activator having a reactivity such that organoaluminum halides present in the polymerization reaction mixture preferentially react with the activator rather than with the oxidant during polymerization, and the catalyst is characterized by certain specified proportions of the components relative to the amount of vanadium present. The catalyst system of this invention provides very high vanadium efficiencies compared to corresponding prior art vanadium coordination catalysts.

POLYMERS

The catalyst of this invention is generally useful in polymerizing alpha-olefins to produce OM, EOM AND EPDM polymers. It is particularly useful in preparing polymers of monomer combinations such as ethylene/propylene/dicyclopentadiene, ethylene/propylene/methylenenorbornene, ethylene/propylene/ethylidenenorbornene and ethylene/propylene/1,4-hexadiene, but polyethylene, polypropylene and ethylene/propylene polymers can also be prepared with similar advantages. Other representative monomers which can be polymerized using the catalyst of this invention are disclosed in U.S. 2,933,480 to Gresham et al., U.S. 3,162,620 to Gladding and U.S. 3,093,621 to Gladding et al. The catalyst is generally useful in polymerizing monomers which can be polymerized by a coordination catalyst.

CATALYST COMPONENTS

The catalysts used in the process of this invention are vanadium-based coordination catalyst which have been further modified by adding thereto an activator, and adjusting the proportions of vanadium, aluminum, oxidant and activator within certain ranges. Any of the vanadium compounds known to the art to be useful as components of coordination catalysts for polymerizing alpha-olefins can be used. These include vanadium halides, vanadium oxyhalides, addition complexes of vanadium halides with oxygen- and nitrogen-containing ligands, chelate complexes of vanadium with 1,3-diketone compounds and compounds such as alkyl vanadate esters, Suitable vanadium compounds include, for example, $VCl_4$, $VOCl_3$, vanadium tris (acetylacetonate), vanadium oxybis(acetylacetonate), trimethyl vanadate, triisopropyl vanadate

tetrakis(beta-ethoxyethoxy)vanadium, allyl vanadate

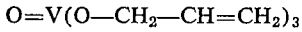

tri-n-octadecyl vanadate, tetrahydrofuranate of $VCl_3$, bis (gamma-isopropoxy)vanadium dibromide, beta-ethoxyethoxy vanadium trichloride, 2,2-dimethyl-1,3-propylenedioxy vanadyl fluoride, fluorovanadyl bis(acetylacetonate), diethoxy vanadyl fluoride, vanadium tris(thenoyl trifluoroacetonate), vanadium tris(trifluoroacetyl acetonate), pyridinate of $VCl_3$, trimethylaminate of $VCl_3$, tris(2-ethyl hexyl) vanadate, $VI_4$, $VBr_4$, $VOBr_3$, $VOI_3$ and dibromo vanadyl acetylacetonate. Preferred vanadium components for the catalyst are $VCl_4$, $VOCl_3$ and vanadium trisacetylacetonate.

Organoaluminum halides useful as components of the catalysts are dialkylaluminum halides, alkylaluminum dihalides, arylaluminum halides and mixtures thereof, e.g., sesquihalides. The chlorides are preferred halides but the bromides and iodides can be used; fluorides can be used in admixture with other halides. The organoaluminum halides disclosed in U.S. Pat. 3,301,834 to Christman are suitable as are the following, for example, dimethyl aluminium chloride, diethyl aluminum chloride, ethyl aluminum sesquichloride, ethyl aluminum dichloride, diisobutyl aluminum chloride, ethyl aluminum dibromide, isobutyl alminum dichloride, di-n-hexyl aluminum chloride, n-dodecyl aluminum dichloride, dioctadecyl aluminum chloride, decyl ethyl aluminum chloride, dimethyl aluminum bromide, diethyl aluminum bromide, isoamyl dodecyl aluminum iodided, butyl aluminum sesquiiodide, phenyl aluminum sesquiiodide, dibutyl aluminum fluoride, diphenyl aluminum chloride, diethyl aluminum fluoride and octadecyl aluminum dichloride. Preferred are the acylic organoaluminum halides in which the acyclic groups contain 1–8 carbon atoms such as diethyl aluminum chloride, ethyl aluminum dichloride, dipropyl aluminium chloride. diisobutyl aluminum chloride, isobutyl aluminum dichloride and diisobutyl aluminum bromide.

When the oxidant contains a carbonyl group (as in $CX_nH_{3-n}J$ where $J=-CO_2R$, $-COR'$, $-CONR_2$) or a $-SO_mX$ group, it is preferred that component (b) described hereinbefore be an organoaluminum dihalide.

It is immaterial whether these catalysts are used in solution or dispersion polymerizations. Batch or continuous processes can be used. Usually, for convenience, the catalyst components are added separately in the form of solutions to the polymerization medium, although the vanadium and activator components can be admixed prior to use if desired. These procedures are known to the art.

One of the important advantages of this invention is the high catalyst efficiency attained with the catalyst. Catalyst efficiency is measured in terms of grams of polymer produced per gram mole of vanadium used. The catalyst of this invention, where used to prepare ethylene/propylene/1,4-hexadiene polymers, can have efficiencies of more than 50,0000 in thirty minutes and frequently more than a million. These catalysts usually have an efficiency of at least twice that of the same catalyst without the activator and often many times the efficiency without the activator.

Known halogen containing oxidants which are useful in accordance with this invention include, for example, benzotrichloride, hexachloroacetone, ethyl trichloroacetate, trichloroacetic acid, hexachloropropylene, methyl tribromoacetate, tribromoacetic acid, ter-butyl trichloroacetate, bis(perchloroallene), carbon tetrabromide, benzene sulfonyl chloride, benzene sulfinyl chloride, benzene sulfonyl bromide, benzene sulfonyl iodide, p-bromobenzene sulfonyl chloride, naphthalene sulfonyl chloride, ethane sulfonyl chloride, sulfuryl chloride, thionyl chloride, $CCl_3-CCl=CCl-COCl$, $CCl_3-CCl=CCl-COBr$, $CCl_3$—$CCl$=$CCl$—$CO$—$CCl_3$ and 10,10-diisopropoxy-1,7,8,9-tetrachloro tricyclo[5.2.1.0$^{2,6}$]-8-decene.

In addition to providing a catalyst system having much higher vanadium efficiency than corresponding prior art catalysts, a specific embodiment of the present invention provides vanadium-based coordination catalyst systems containing oxidant compounds not heretofore known to be useful for this puropse.

Representative of the oxidants are $Cl_2C$=$CH$—$CCl_3$, $Cl_2C$=$CClCCl_2Br$, $(Cl_3C)_2C$=$CCl$, $(Cl_2C$=$CCl$—$CCl_2)_2$ $C_6H_5H_gCX_3$, 2 - bromo-2-methylpropionyl bromide, N-bromopyridinium tribromide, bromoacetyl bromide, chloroacetyl chloride, hexachloro-3-thiolene, trichloroacetyl chloride, trichloroacetic anhydride.

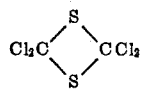

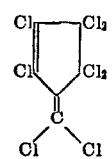

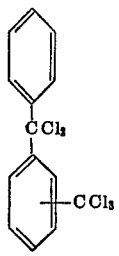

2,2,2 - trichloro-N-phenylacetamide, 2,2,2-trichloro-N,N-diphenylacetamide, 2 - trichloromethyl - 1 - propene, $QSCCl_3$, $R''SCCl_3$, $Q$—$CHBr$—$CH_2Br$, $QCHX_2$,

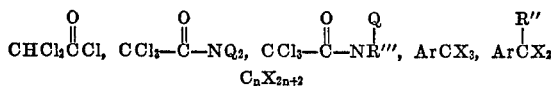

$C_nX_{2n+2}$ where $n$ is greater than one, $R''$ is defined above, $Q$ is aryl such as phenyl naphthyl, etc., $R'''$ is alkyl, Ar is aryl other than phenyl (such as naphthyl), haloaryl, X is halogen such as Cl, Br or I. Specific examples of oxidants described generically above, include $C_6H_5H_gCCl_3$,

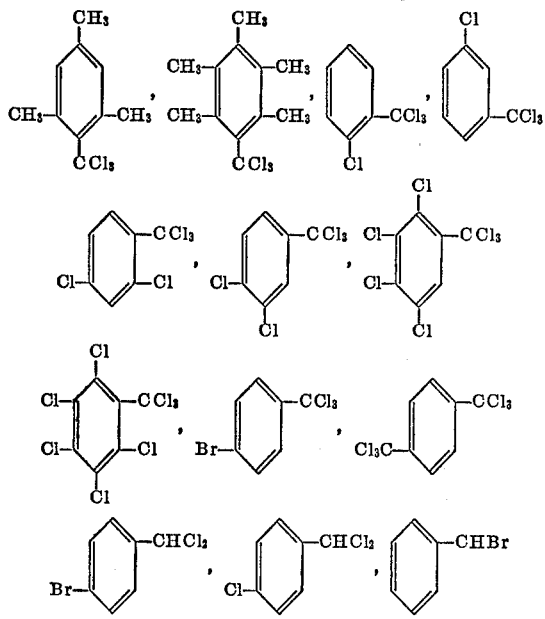

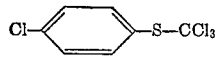

and

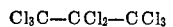

As stated before, when the oxidant contains a carbonyl group, or a —$SO_mX$ group, it is preferred that component (b) hereinbefore described be an organoaluminum dihalide.

The activator used in accordance with this invention is a hydrocarbon soluble compound selected from the group (1) isoprenylaluminum, (2) hydrocarbon-soluble Lewis bases such as ethers, amides, ketones and organic amines, most preferably of less than about 19 carbons, (3) trialkylaluminum compounds, preferably of less than about 31 carbon atoms and (4) compounds having the formula

where —A is acetylacetonate, —$OR^4$, —$NR^4R^5$,

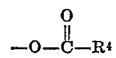

or

$R_2$ being Cl, Br or alkyl, preferably about $C_1$–$C_{18}$, and each of $R^3$, $R^4$ and $R^5$ is alkyl, preferably about $C_1$–$C_{18}$, most preferably about $C_1$–$C_6$, and $R^6$ is alkylene, preferably about $C_4$–$C_5$.

When the activator is an ether, ketone, amide or amine, it is preferred that the activator be monofunctional, although polyfunctional compounds may be employed when the hetero atoms of the functional groups are separated by at least about 6 carbon atoms.

Representative ethers include, for example, dimethyl ether, diethyl ether, tetrahydrofuran, furan, tetrahydropyran, dihydropyran, anisole, methyl tert-butyl ether, n-propyl isobutyl ether, diisoamyl ether, dibutyl ether, ethyl phenyl ether, methyl benzyl ether, methyl p-tolyl ether, n-butyl phenyl ether, sec-butyl benzyl ether, isoamyl benzyl ether, dibenzyl ether, methyl diphenyl ether, ethyl 4-cyclohexylphenyl ether, methyl benzyl ether, 8-methoxy quinoline, methyl sec-butyl ether, di-tert butyl ether, ethyl pentyl ether, methyl tert butyl ether, ethyl pentyl ether, methyl tert-pentyl ether, bis(1-methyl pentyl) ether, ethyl decyl ether, didecyl ether, ethyl octadecyl ether, methyl 4-isopropyl phenyl ether, methyl mesityl ether, and bis (1-ethyl-3-phenylpropyl) ether.

Representative amides include, for example, acetamide, N-methylacetamide, N,N-dimethylformamide, propionamide, N,N-dimethylacetamide, butyramide, isobutyramide, N,N-dimethylacetamide, cyclopropanecarboxamide, valeramide, isovaleramide, N-tert-butyl formamide, caproamide, N-n-butylacetamide, N-tert-butylacetamide, N-isoamylacetamide, N,N-dimethyl heptamide, N-methyl-N-octadecylacetamide, stearamide, myristamide, eicosamide, nonamide, decanamide, lauramide, N,N-diethyl benzamide, 2 - naphthamide, 1-naphthalenepropionamide, 2-acetamidopyridine, 2-acetamido quinoline, 2-pyrrolidinone, 6 - methyl-2-piperidone, undecanamide, alpha-methyl-dodecamide, 2-ethyl-palmitic acid amide, 2-octyl-undecanamide, eicosanoic acid amide and $(CH_3)_2CH(CH_2)_{31}CONH_2$ Representative ketones include, for example, acetone, methyl ethyl ketone, methyl isobutyl ketone, cyclopentanone, cyclohexanone, methyl isopropyl ketone, methyl n-amyl ketone, ethyl butyl ketone, ethyl tert-butyl ketone, methyl neopentyl ketone, diisopropyl ketone, 3,3-dimethyl-2-pentanone, ethyl pentyl ketone, propyl isopropyl ketone, diisobutyl ketone, isopropyl hexyl ketone, methyl nonyl ketone, ethyl octyl ketone, n-pentyl neopentyl ketone, methyl decyl ketone, propyl octyl ketone, ethyl tetradecyl ketone, methyl nonadecyl ketone, didecyl ketone, tert-butyl heptadecyl ketone, octyl eicosyl ketone, dihexadecyl ketone, diheneicosyl ketone, cycloheptanone, cyclooctanone, cyclononanone, 4-propyl cyclo hexanone, cyclodecanone, cycloheptadecanone, cyclohexyl decyl ketone, cyclodocosanone and cyclotetratricontanone.

Representative amines include, for example, aniline, dimethyl aniline, ethylamine, propylamine, n-butylamine, trihexylamine, sec-butylamine, isobutylamine, tert-butylamine, isoamylamine, methyl isopropylamine, butyl-n-methylamine, ethyl-n-propylamine, N,N-diethyl methylamine, n-hexylamine, ethyl-n-butylamine, triethylamine, n-heptylamine, n-butyl-n-propylamine, n-butyl-n-isopropylamine, ethyl-n-hexylamine, di-n-butylamine, di-n-hexylamine, cyclopropylamine, cyclopentylamine, cyclohexylamide, dicyclohexylamine, benzylamine, N-methylaniline, p-toluidine, alpha-phenylethylamine, o-methyl benzylamine, N-ethyl aniline, N,N-dimethylphenethylamine, N,N-diethylaniline, 1-naphthylamine, 2-naphthylamine, 2-furanamine, 2-aminopyridine, 2,3-xylidine; N-ethyl-N-methyl propylamine, N,N-dimethyl butylamine, N-ethyl dipropylamine, N-cyclohexylhexylamine, N,N-diethyl butylamine, p-dioxan-2-amine, 4H-pyran-3-amine, furfurylamine, 1-naphthalenemethylamine, 1,7-heptanediamine, 1-methyl heptylamine, dinonylamine, ditridecylamine, tritetradecylamine, 2-hexyloctylamine, bis(2-hexyl octyl) amine, dipentadecylamine, N-methylhexadecylamine, N-ethyl-hexadecylamine, N,N-dimethyl octadecylamine, N,N-dibutyloctadecylamine, eicosylamine, docosylamine, N-methyldibenzylamine, tribenzylamine and 2,4-di-n-butylaniline.

Representative trialkylaluminum compounds include, for example, trimethylaluminum, triethylaluminum tripropylaluminum, triisobutylaluminum, trihexylaluminum, trioctylaluminum, tridecylaluminum, trioctadecylaluminum, ethyldimethylaluminum, butyldiethylaluminum, diethyldodecylaluminum, diethyloctadecylaluminum, dibutyl pentadecylaluminum, butylethyl pentylaluminum, butylethylheptadecylaluminum and trieicosylaluminum.

Representative compounds of the formula

include, for example, diethylaluminum ethoxide, diethylaluminum isopropoxide, diisobutylaluminum n-butoxide, ethylmethylaluminum ethoxide, diethylaluminum methoxide, didecylaluminum ethoxide, dioctadecylaluminum isopropoxide, dodecylethylaluminum hexoxide, isooctylpentyl aluminum pentoxide, dihexylaluminum eicosoxide, dimethylaluminum acetylacetonate, diethylaluminum acetylacetonate, ethyl propylaluminum acetylacetonate methylnonyl aluminum acetylacetonate, dihexylaluminum acetylacetonate, dieicosylaluminum acetylacetonate, butyl hexadecylaluminum acetylacetonate, dimethylaminodiethylaluminum, diethylamino di-methylaluminum, dibutylamino dihexylaluminum, dioctylamino methyl propylaluminum, methyloctadecylaminoethyleicosylaluminum, diethyl piperidinoaluminum, didecylpiperidino aluminum, dibutyl pyrrolidinyl, aluminum isopropyl pentadecylpyrrolidinylaluminum, dimethylaluminum acetate, dimethylaluminum propionate, dipropylaluminum isobutyrate, dibutylaluminum octanoate, ethylhexylaluminum laurate, ethyloctadecylaluminum myristate, didecylaluminum palmitate, didocecylaluminum stearate, dibutylaluminum eicosanoate, dimethylaluminum undecanoate and pentatridecylaluminum 2-butyloctanoate and isobutyl

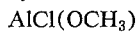

Preferred activators are trialkylaluminum compounds and compounds of the general formula

as defined above, the compounds triethylaluminum, triisobutylaluminum, isoprenylaluminum, tridecylaluminum, diethylaluminum ethoxide and diisobutylaluminum ethoxide are particularly preferred for excellent performance, ready availability and excellent handling characteristics.

In any given instance a Lewis base can be tested to determine its operability as an activator for use in the present invention by the following procedure. Admix one molar part of the candidate with two molar parts of benzotrichloride and add this mixture to five molar parts of diisobutylaluminum chloride which exists as a one-tenth molar solution in an inert solvent. The test solvent is preferably the medium to be used in the polymerization. If the mixture does not turn brown within thirty minutes the candidate is suitable as the activator component in the catalyst mixture used in the process of this invention. Ordinary room temperatures are used for this test.

The amount of activator utilized in any case will usually be determined by the amount and nature of the oxidant utilized; both of these and the nature and amount of organoaluminum compound are determined by the amount of vanadium present. The amount of activator needed usually increases in proportion to the amount of oxidant, the temperature and the residence time. By the above-described test a skilled chemist can readily ascertain the minimum proportions of activator needed in any given situation. Usually activator:oxidant ratios of 0.25/1 to 2/1 will be sufficient.

The activator is used in the catalyst in the amount of about 0.1–150 molar parts based on vanadium in the catalyst and preferably in the amount of 0.5 to 100 parts per part of vanadium present. The activator concentration selected will be high when the oxidant concentration is high, and low when the oxidant concentration is low.

The catalysts of this invention are utilized to prepare OM polymers by established techniques. Suitable diluents include hexane, heptane, benzene, toluene, chlorobenzene, cyclohexane, tetrachloroethylene, trifluoroethane, methylene chloride, etc.

The advantages of this invention can be readily seen in Table I where there is compared the efficiencies of some of the preferred catalyst systems with the corresponding prior art three component systems in which the activator is absent. In each case the monomers polymerized with ethylene/propylene/1,4-hexadiene (incorporated substantially in the proportions of 60/35/5) and the polymerization was conducted at 25° C. All parts, percentages and proportions referred to herein are by weight unless otherwise indicated.

In Table I Runs 1–8 were on a continuous basis according to the procedure of Example 3 below. Runs 9–16 were carried out as follows:

The polymerization-grade gaseous ethylene and propylene were passed through Linde 5–A molecular sieves before use. The polymerization-grade liquid 1,4-hexadiene (predominately trans-) was passed through indicating silica gel and then through Woelm neutral alumina under a nitrogen atmosphere and subsequently stored until use in the dark over indicating silica gel protected by a nitrogen atmosphere. The hexane solvent was sparged with nitrogen and passed slowly through Linde 5–A molecular sieves before use.

Ethylene and propylene were introduced at the rates of 1 liter and 2 liters per minute, respectively, above the surface of a 500-milliliter charge of hexane agitated at 25° C. by a polytetrafluoroethylene stirrer in a 1-liter 4-neck glass flask. After about 5–10 minutes the solvent was considered to be saturated with the monomers which were introduced thereafter continually at the same rate. A 5-milliliter proportion of 1,4-hexadiene was introduced by a syringe. The coordination catalyst components were then added sequentially from syringes with a minute or less interval between the additions. Diethylaluminum chloride (Runs 9, 10), ethylaluminum sesquichloride (Runs 11–14) or isobutylaluminum dichloride (Runs 15–16)

was the first component and was added as a one normal solution (1 g. atom of aluminum per liter) in heptane.

For Runs 10, 12 and 14, $Et_2AlOEt$ was next introduced (as a one normal solution in heptane), the oxidant was added (neat), then $VCl_4$ was added (as a 0.01 M solution in tetrachloroethylene).

In Runs 15–16, after the i-BuAlCl$_2$ addition, hexachloropropene was added (neat); the $VCl_4$ was added (as a 0.01 M solution in tetrachloroethylene) and, simultaneously, the addition of activator (as a 0.1 normal solution in heptane) was begun at the rate of 2.1 meq. per hour.

All polymerizations were run at 25° C. For Runs 9 and 10, catalyst efficiency was determined from the dry weight of a 25-ml. sample withdrawn at the indicated time. For Runs 11–16, catalyst efficiency was determined from the weight of polymer isolation by precipitation at the indicated time. In all cases where isolated, polymer composition was spectroscopically determined.

polymerization a yellow color formed by changing by the end of 51 minutes to black. A total of 31.6 g. of polymer was then isolated by acidified (e.g., aqueous HCl) acetone/MeOH (1:1) precipitation. The catalyst efficiency for this batch operation was 1.26 million. The ethylene tripolymer obtained had an inherent viscosity of 2.20 and contained 4.02% 1,4-hexadiene and 49% propylene.

Example 2

Hexane was thoroughly sparged with nitrogen. It was then fed by nitrogen pressure through molecular sieve-packed towers to remove last traces of water or similar catalyst poisons before metering into a reactor at atmospheric pressure. Diisobutylaluminum chloride and diethylaluminum ethoxide (prepared from triethylaluminum and absolute ethanol in equimolar quantities) were added to hexane in a 3:1 mole ratio and a total aluminum concentration of 0.1 M in a feed tank. Vanadium oxytrichloride was prepared as a 0.002 M solution in hexane,

TABLE I

| Run | Vanadium compound | V, conc.[a] | Organo aluminum compound | Al/V[b] | Oxident | Ox./V[c] | Activator | Act./V[d] | Efficiency[e] | Reaction time (min.) |
|---|---|---|---|---|---|---|---|---|---|---|
| 1 | $VOCl_3$ | 0.01 | $iBu_2AlCl$[f] | 160 | C$_6$H$_5$–CCl$_3$ | 20 | None | | 135,000 | 41 |
| 2 | $VOCl_3$ | 0.054 | $iBu_2AlCl$[f] | 112.5 | Same | 20 | $Et_2AlOEt$[g] | 37.5 | 985,000 | 39 |
| 2a | $VOCl_3$ | 0.054 | $iBu_2AlCl$[f] | 80 | do | None | None | | (*) | 39 |
| 3 | $VOCl_3$ | 0.04 | $Et_2AlCl$[h] | 20 | do | 20 | None | | (*) | 30 |
| 4 | $VOCl_3$ | 0.04 | $Et_2AlCl$[h] | 20 | do | 20 | $Et_3Al$[i] | 10 | 881,000 | 30 |
| 5 | $VOCl_3$ | 0.043 | $Et_2AlCl$[h] | 40 | $C_3Cl_5H$[k] | 20 | None | | (*) | 28 |
| 6 | $VOCl_3$ | 0.043 | $Et_2AlCl$[h] | 40 | $C_3Cl_5H$[k] | 20 | $Et_2AlOEt$ | 20 | 635,000 | 28 |
| 7 | $VOCl_3$ | 0.043 | $Et_2AlCl$[h] | 40 | $C_3Cl_5H$[k] | 50 | None | | (*) | 31 |
| 8 | $VOCl_3$ | 0.043 | $Et_2AlCl$[h] | 40 | $C_3Cl_5H$[k] | 50 | $Et_3Al$ | 20 | 1,575,000 | 31 |
| 9 | $VCl_4$ | 0.02 | $Et_2AlCl$[h] | 400 | C$_6$H$_5$–CCl$_3$ | 1,000 | None | | (*) | 18.5 |
| 10 | $VCl_4$ | 0.02 | $Et_2AlCl$[h] | 250 | Same | 1,000 | $Et_2AlOEt$ | 150 | 960,000 | 18.5 |
| 11 | $VCl_4$ | 0.02 | $Et_{1.5}AlCl_{1.5}$ | 200 | C$_6$H$_4$(CCl$_3$)(Cl) | 250 | None | | 568,000 | 30 |
| 12 | $VCl_4$ | 0.02 | $Et_{1.5}AlCl_{1.5}$ | 200 | Same | 250 | $Et_2AlOEt$ | 100 | 796,000 | 30 |
| 13 | $VCl_4$ | 0.02 | $Et_{1.5}AlCl_{1.5}$ | 200 | C$_6$H$_4$(CCl$_3$)$_2$ | 125 | None | | 200,000 | 30 |
| 14 | $VCl_4$ | 0.02 | $Et_{1.5}AlCl_{1.5}$ | 200 | Same | 125 | $Et_2AlOEt$ | 100 | 1,395,000 | 30 |
| 15 | $VCl_4$ | 0.05 | $iBuAlCl_2$[j] | 64 | $C_3Cl_6$ | 200 | None | | (*) | 60 |
| 16 | $VCl_4$ | 0.05 | $iBuAlCl_2$[j] | 64 | $C_3Cl_6$ | 200 | $Et_3Al$ | 84 | 1,660,000 | 60 |

[a] Vanadium compound concentration in millimoles per liter of diluent,
[b] Atomic ration of aluminum (in organoaluminum compound) to vanadium,
[c] Molar ratio of oxidant to vanadium.
[d] Molar ratio of activator to vanadium.
[e] Grams of polymer per gram mole of vanadium.
[f] Diisobutylaluminum chloride.
[g] Diethylaluminum ethoxide.
[h] Diethylaluminum chloride.
[i] Trialkylaluminum.
[j] Isobutylaluminum dichloride.
[k] 2-hydropentachloropropene.
* No polymer formed.

Example 1

To 1000 ml. of cyclohexane presaturated with ethylene/propylene monomers in an atmospheric-pressure reactor (conditions: 20° C.; flow rates ethylene one liter/min., propylene three liters/min.) were added in turn:

(a) 5 mmoles diisobutylaluminum chloride (0.1 M in tetrachloroethylene)
(b) 0.10 g. aniline (as a 10% solution in tetrachloroethylene)
(c) 5 ml. 1,4-hexadiene
(d) 0.4 ml. benzotrichloride
(e) 0.025 mmoles $VCl_4$ (0.025 M in cyclohexane)

Polymerization began slowly and increased in rate with time. At the end of three minutes the rate was rapid; this rate was maintained for 51 minutes at 20° C. During benzotrichloride as a 0.05 M solution in hexane and 1,4-hexadiene (97% trans) as a 2 M solution in hexane in separate feed tanks. These solutions and hexane were fed to a well-stirred reactor of 500 ml. capacity as a total liquid feed of 750 ml. per hour, at 0.04 millimole of $VOCl_3$ per hour, 6 millimoles of combined aluminum compounds per hour, 0.8 millimole of benzotrichloride per hour and 44 millimoles of 1,4-hexadiene per hour. Ethylene and propylene were fed into the reactor solution at 2.1 and 3.53 moles per hour. When the reactor polymer production had reached a steady value the effluent was collected, washed with aqueous HCl solution and finally with water before polymer isolation by evaporation of the solvent. The polymer yield was 39.4 grams hour and the polymer contained 40% propylene and 3.3% 1,4-hexadiene. The inherent viscosity of the polymer (0.1 g. polymer in 100 ml. perchloroethylene at 30° C.) was 1.97.

Efficiency of the catalyst was 985,000. Without the activator the diisobutylaluminum chloride/vanadium oxychloride ratio had to be increased to 160 to obtain high molecular weight polymer of approximately the same composition as above and the efficiency was only 135,000.

Example 3

The procedure of Example 2 was employed using a total liquid feed of 1.716 liters per hour in a reactor with a colume of about 800 ml., feeding 80 mmoles of 1,4-hexaadiene, 6.0 mmoles of mixed aluminum compounds as a 0.05 molar solution in hexane, 2 mmoles of benzal chloride as a 0.025 M solution in hexane, 0.04 mmole of vanadium acetylacetonate as a 0.001 M solution in hexane, 1.47 moles of ethylene and 2.34 moles of propylene per hour. At steady state the polymer yield was 25.5 grams per hour. The isolated polymer contained 30% propylene and 4.0% hexadiene and had an inherent viscosity (0.1 g. polymer in 100 ml. perchloroethylene at 30° C.) of 2.35. Efficiency of the catalyst was 638,000. Without the ethoxide, no polymer was produced.

Example 4

The atmospheric pressure batch reactor used is a 3-neck 1000 ml. glass flask equipped with a stirrer and a thermometer. After 500 ml. of hexane have been added at 25° C., gaseous ethylene and propylene are introduced at the respective rates of one and 2 liters/minute. A saturated solution of these monomers is obtained in about 5 minutes. A 2-ml. portion of 1,4-hexadiene is injected from a syringe while ethylene and propylene continue to enter at the above-described rates. Finally, the catalyst is formed by injecting the following components, in turn: 5 millimoles of an ethyl aluminum dichloride; 1.25 millimoles of an oxidant; 1.25 millimoles of activator; and 0.025 millimole of vanadium oxytrichloride. The table below gives the components added. Forty-five minutes after introduction of the vanadium compound, the polymerization is terminated by deactivating the catalyst with 5 milliliters of isopropyl alcohol. After the solvent has been evaporated, the resulting ethylene/propylene/1,4-hexadiene is dried in a vacuum oven at 115° C. for one hour. Data showing yields are given in the table below.

Runs, outside the scope of the present invention are made, in which no activator and no oxidant are employed. Comparative data thus obtained are included in the table below:

TABLE

| Run | Oxidant | Activator | Yield of polymer in grams |
|---|---|---|---|
| 1[1] | None | None | 1.0 |
| 2[1] | φ—NH—C(O)—CCl₃ | do | 2.2 |
| 3 | Same as above | Et₃Al | 6.0 |
| 4 | do | φ—O—CH₃ | 6.6 |
| 5 | do | Et₃AlOEt | 8.6 |
| 6[1] | Cl₃C—C(O)—CCl₃ | None | 3.7 |
| 7 | Same as above | Et₃Al | 4.4 |
| 8 | do | φ—O—CH₃ | 4.6 |
| 9 | do | Et₂AlOEt | 7.6 |

[1] Outside the scope of this invention, provided for comparison.

We claim:
1. A coordination catalyst system capable of polymerizing α-olefins consisting essentially of (a) a hydrocarbon-soluble vanadium compound selected from the group consisting of vanadium halides, vanadium oxyhalides, addition complexes of vanadium halides with tetrahydrofuran, pyridine or trimethylamine chelate complexes of vanadium with 1,3-diketones and alkyl vanadate esters, (b) an organoaluminum halide selected from the group consisting of dialkyl aluminum halides, alkyl aluminum dihalides and mixtures thereof, (c) a halogen-containing oxidant which is (i) bis(perchloroallene), or an unsaturated perchlorinated acid halide of about 3–6 carbon atoms, (ii) a compound of the formula $YCX_nR^1_{3-n}$ wherein X is chlorine, bromine, or iodine, $n=2–3$, $R^1$ is H, about $C_1–C_6$ perhaloalkyl, about $C_6–C_{10}$ aryl, or about $C_6–C_{10}$ haloaryl, and Y is about $C_6–C_{10}$ aryl, or (iii) a compound of the formula $Y'CX_3$ wherein Y' is

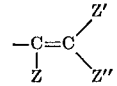

wherein Z is hydrogen, halogen, alkyl, haloalkyl, aryl, or haloaryl, and Z' and Z" are independently halogen, hydrogen, or trichloromethyl; when the organoaluminum halide of component (b) is an alkyl aluminum dihalide, then the halogen-containing oxidant can also be a compound of the formula $CX_nH_{3-n}J$ or $R^7SO_mX$ wherein $m$ is 1–2, X is chlorine, bromine, or iodone, $R^7$ is halogen, haloalkyl, about $C_1–C_{20}$ alkyl, about $C_6–C_{10}$ aryl, or about $C_6–C_{20}$ haloaryl, J is $—CO_2R$; $—COR'$ $—CONR_2$, or $SO_mX$ wherein R represents hydrogen, about $C_1–C_{20}$ alkyl, about $C_6–C_{10}$ aryl, about $C_6–C_{10}$ haloaryl, or about $C_7–C_{20}$ alkaryl; R' represents about $C_1–C_{20}$ alkyl, halogen, about $C_1–C_{10}$ haloalkyl, about $C_6–C_{10}$ aryl, about $C_2–C_6$ perhalo alkenyl, about $C_6–C_{10}$ haloaryl, or about $C_7–C_{20}$ alkaryl, (d) an inert organic diluent, and (e) a hydrocarbon soluble activator which is more reactive with organoaluminum halides in the catalyst system than is the oxidant and which is (1) trialkyl aluminum, (2) a Lewis base which is a monofunctional hydrocarbyl ether, hydrocarbyl ketone, hydrocarbyl amide, or hydrocarbyl amine or a polyfunctional hydrocarbyl ether, hydrocarbyl ketone, hydrocarbyl amide, or hydrocarbyl amine wherein the hetero atoms of the functional groups are separated by at least about 6 carbon atoms, or (3) a compound of the formula

where A is $—OR^4$, acetylacetonate, $—NR^5R^4$,

or

$R^2$ is alkyl; each of $R^3$, $R^4$, and $R^5$ being an alkyl group, $R^6$ being alkylene, each of said compounds (1), (2), and (3) containing less than about 61 carbon atoms, the ratios of aluminum atoms from the organoaluminum halide, oxidant moles and activator moles to vanadium atoms being about 3–200, 1–2000, and 0.1–150, respectively.

2. The catalyst of claim 1 in which the activator is a trialkylaluminum.

3. The catalyst of claim 2 in which the activator is triethylaluminum.

4. The catalyst of claim 2 in which the activator is triisobutyl aluminum.

5. The catalyst of claim 1 in which the activator is a compound of the formula

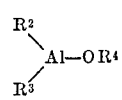

6. The catalyst of claim 1 wherein the activator is a monofunctional ether, ketone, amide or amine.

7. The catalyst of claim 1 in which the components are:
(a) vanadium oxytrichloride
(b) diethylaluminum chloride
(c) a benzotrichloride
(e) trialkylaluminum.

8. The catalyst of claim 1 in which the components are:
(a) vanadium oxytrichloride
(b) diethylaluminum chloride
(c) a benzotrichloride
(e) trialkylaluminum.

9. The catalyst of claim 1 in which the components are:
(a) vanadium oxytrichloride
(b) diethylaluminum chloride
(c) a halogen substituted benzotrichloride
(e) trialkylaluminum.

10. The catalyst of claim 1 in which the activator is diethylaluminum ethoxide.

11. The catalyst of claim 5 in which the activator (e) is diethylaluminum isopropoxide.

12. The catalyst of claim 5 in which the activator is diisobutyl aluminum ethoxide.

13. The catalyst of claim 5 in which the oxidant (c) is p-bis(trichloromethyl)benzene and the activator is diethylaluminum ethoxide.

14. The catalyst of claim 5 wherein the components are:
(a) vanadium oxytrichloride
(b) dialkyl aluminum chloride
(c) a benzotrichloride
(e) $R^2$ and $R^3$ of the activator are each isobutyl.

15. The catalyst of claim 14 wherein component (b) is diethyl aluminum chloride or diisobutyl aluminum chloride.

16. The catalyst of claim 14 wherein component (e) is diisobutyl aluminum ethoxide.

17. The catalyst of claim 15 wherein component (e) is diisobutyl aluminum ethoxide.

References Cited

UNITED STATES PATENTS

| | | | |
|---|---|---|---|
| 3,113,115 | 12/1963 | Ziegler et al. | |
| 3,118,865 | 1/1964 | Bruce et al. | 252—429 C X |
| 3,203,940 | 8/1965 | Long. | |
| 3,259,610 | 7/1966 | Glammer et al. | 252—429 B X |
| 3,301,834 | 1/1967 | Christman. | |
| 3,354,139 | 11/1967 | Vandenberg | 252—429 B X |
| 3,412,174 | 11/1968 | Kroll | 252—429 C UX |
| 3,547,864 | 12/1970 | Lasis | 252—429 B X |
| 3,551,395 | 12/1970 | Schaum et al. | 252—431 UX |

FOREIGN PATENTS

| | | | |
|---|---|---|---|
| 1,059,865 | 2/1967 | Great Britain | 252—429 B |

PATRICK P. GARVIN, Primary Examiner

U.S. Cl. X.R.

252—429 C, 431 R, 431 C, 431 N; 260—94.9 C, CA, CD, 88.2, 93.7

UNITED STATES PATENT OFFICE
CERTIFICATE OF CORRECTION

Patent No. 3,723,348                    Dated March 27, 1973

Inventor(s) David Apotheker and Norman M. Van Gulick

It is certified that error appears in the above-identified patent and that said Letters Patent are hereby corrected as shown below:

In the Claims, Claim 8(e) should read as follows:

(e) triethylaluminum

Signed and sealed this 6th day of August 1974.

(SEAL)
Attest:

McCOY M. GIBSON, JR.
Attesting Officer

C. MARSHALL DANN
Commissioner of Patents